United States Patent
Zhang et al.

(10) Patent No.: US 9,838,492 B2
(45) Date of Patent: Dec. 5, 2017

(54) DATA PUSHING METHOD, APPARATUS, AND SYSTEM

(71) Applicant: HUAWEI TECHNOLOGIES CO., LTD., Shenzhen (CN)

(72) Inventors: Lixue Zhang, Beijing (CN); Chunshan Xiong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 148 days.

(21) Appl. No.: 14/682,508

(22) Filed: Apr. 9, 2015

(65) Prior Publication Data
US 2015/0215415 A1 Jul. 30, 2015

Related U.S. Application Data

(63) Continuation of application No. PCT/CN2012/082632, filed on Oct. 9, 2012.

(51) Int. Cl.
*H04L 29/08* (2006.01)
*H04W 4/14* (2009.01)
(Continued)

(52) U.S. Cl.
CPC ......... *H04L 67/26* (2013.01); *H04L 67/2842* (2013.01); *H04W 4/14* (2013.01);
(Continued)

(58) Field of Classification Search
None
See application file for complete search history.

(56) References Cited

U.S. PATENT DOCUMENTS 7,957,393 B2* 6/2011 Lundin ............... H04L 12/5695 370/338
8,040,803 B1 10/2011 Pawar et al.
(Continued)

FOREIGN PATENT DOCUMENTS

CN 101568027 10/2009
CN 101888412 11/2010
(Continued)

OTHER PUBLICATIONS

English Machine Translation for FR 2884379 A1.*
(Continued)

*Primary Examiner* — Jason Mattis
*Assistant Examiner* — James P Duffy
(74) *Attorney, Agent, or Firm* — Staas & Halsey LLP

(57) ABSTRACT

The present invention relates to a data pushing method, apparatus, and system. The data pushing method includes: sending a query request for a camp-on state of a mobile terminal to a gateway; receiving reply information that is about the camp-on state of the mobile terminal and returned by the gateway; determining, according to the camp-on state of the mobile terminal, a data volume of cached content to be pushed; and sending a pushing instruction to a main cache; sending the first pushing instruction to the main cache if the mobile terminal is in a first camp-on state; and sending the second pushing instruction to the main cache if the mobile terminal is in a second camp-on state, so as to control the main cache to push a second data volume of data of the cached content to the mobile terminal.

18 Claims, 7 Drawing Sheets

(51) Int. Cl.
*H04W 8/02* (2009.01)
*H04W 88/16* (2009.01)

(52) U.S. Cl.
CPC ............ *H04W 8/02* (2013.01); *H04W 88/16* (2013.01); *H04L 67/32* (2013.01)

(56) References Cited

U.S. PATENT DOCUMENTS

| | | | |
|---|---|---|---|
| 2003/0186704 A1* | 10/2003 | Tamura | ............ H04L 29/06027 455/450 |
| 2004/0037269 A1 | 2/2004 | Lundin | |
| 2012/0063462 A1 | 3/2012 | Hu et al. | |
| 2013/0166868 A1* | 6/2013 | Jarnikov | .......... H04N 21/23892 711/162 |

FOREIGN PATENT DOCUMENTS

| | | | |
|---|---|---|---|
| CN | 102130914 | 7/2011 | |
| CN | 102215459 | 10/2011 | |
| CN | 102420852 | 4/2012 | |
| EP | 1 523 154 A1 | 4/2005 | |
| FR | 2 884 379 | 10/2006 | |
| FR | 2884379 A1 * | 10/2006 | ......... H04L 12/1859 |

OTHER PUBLICATIONS

Extended European Search Report dated Aug. 4, 2015 in corresponding European Patent Application No. 12886319.8.
"3$^{rd}$ Generation Partnership Project; Technical Specification Group Services and System Aspects; Push architecture (Release 11)", 3GPP TR 23.976, V11.0.0, Sep. 2012, pp. 1-35.
International Search Report dated Jul. 18, 2013 in corresponding international application PCT/CN2012/082632.
PCT International Search Report dated Jul. 18, 2013 in corresponding International Patent Application No. PCT/CN2012/082632.
Chinese Office Action dated Dec. 5, 2016 in corresponding Chinese Patent Application No. 201280015903.6, 7 pages.

* cited by examiner

DATA PUSHING METHOD, APPARATUS, AND SYSTEM

CROSS-REFERENCE TO RELATED APPLICATIONS

This application is a continuation of International Application No. PCT/CN2012/082632, filed on Oct. 9, 2012, which is hereby incorporated by reference in their entireties.

TECHNICAL FIELD

The present embodiment of the invention relates to the field of wireless communications, and in particular, to a data pushing method, apparatus, and system.

BACKGROUND

Currently, a CDN (Content Delivery Network, content delivery network) network is generally used in the communications field to enable a user to acquire required content from a network.

As shown in FIG. 1, FIG. 1 is a CDN network architecture diagram. A Cache (cache) is placed in proximity to a user in a network, so that the user can acquire required content nearby, thereby effectively improving a speed of accessing resources. The CDN is properly combined with a mobile communications network, which can effectively speed up data distribution, especially video data distribution.

Currently, there are two positions at which a cache function can be implemented. One is that a cache is added in a radio access network node, generally in an eNB (evolved Node B, evolved NodeB), an RNC (Radio Network Controller, radio network controller), or a BSC (Base Station Controller, base station controller). The other is that a cache is added between a PDN (Packet Data Network, packet data network) and a P-GW (PND Gateway, packet data network gateway).

After a cache is added by using the foregoing two manners, a main manner of caching content is passive caching; that is, the Cache stores content accessed by a UE (User Equipment, user equipment), and when another UE accesses the same content, the content cached in the Cache is directly provided to the UE. Although a distance between a user and content is shortened by using this method, when acquiring required data, the user still needs to first establish a connection to a network, waits for transmission and buffering of initial video, and can play the video only after buffering time is long enough, which cannot meet an on-demand requirement of the user.

SUMMARY

Embodiments of the present invention provide a data pushing method, apparatus, and system. Data is pushed to a mobile terminal and cached in a cache of the mobile terminal, thereby avoiding a problem that it is required to wait for an initial transmission delay when the data is used.

According to a first aspect, an embodiment of the present invention provides a data pushing method, where the method includes:

sending a query request for a camp-on state of a mobile terminal to a gateway;

receiving reply information that is about the camp-on state of the mobile terminal and returned by the gateway, where the reply information includes the camp-on state of the mobile terminal;

determining, according to the camp-on state of the mobile terminal, a data volume of cached content to be pushed; and sending a pushing instruction to a main cache, where the pushing instruction is a first pushing instruction or a second pushing instruction; sending the first pushing instruction to the main cache if the mobile terminal is in a first camp-on state, so as to control the main cache to push a first data volume of data of the cached content to the mobile terminal; and sending the second pushing instruction to the main cache if the mobile terminal is in a second camp-on state, so as to control the main cache to push a second data volume of data of the cached content to the mobile terminal.

According to a second aspect, an embodiment of the present invention provides a data pushing apparatus, where the apparatus includes:

a first sending unit, configured to send a query request for a camp-on state of a mobile terminal to a gateway;

a first receiving unit, configured to receive reply information that is about the camp-on state of the mobile terminal and returned by the gateway, where the reply information includes the camp-on state of the mobile terminal;

a control unit, configured to determine, according to the camp-on state of the mobile terminal, a data volume of cached content to be pushed; and a second sending unit, configured to send a pushing instruction to a main cache, where the pushing instruction is a first pushing instruction or a second pushing instruction; the first pushing instruction is sent to the main cache if the mobile terminal is in a first camp-on state, so as to control the main cache to push a first data volume of data of the cached content to the mobile terminal; and the second pushing instruction is sent to the main cache if the mobile terminal is in a second camp-on state, so as to control the main cache to push a second data volume of data of the cached content to the mobile terminal.

According to a third aspect, an embodiment of the present invention provides a data pushing system, where the system includes:

the data pushing apparatus according to the foregoing embodiment.

According to a fourth aspect, an embodiment of the present invention provides a data pushing apparatus, where the apparatus includes:

a network interface;
a processor;
a memory; and
an application program physically stored in the memory, where the application program includes instructions that may be used to enable the processor and the apparatus to execute the following process:

sending a query request for a camp-on state of a mobile terminal to a gateway;

receiving reply information that is about the camp-on state of the mobile terminal and returned by the gateway, where the reply information includes the camp-on state of the mobile terminal;

determining, according to the camp-on state of the mobile terminal, a data volume of cached content to be pushed; and sending a pushing instruction to a main cache, where the pushing instruction is a first pushing instruction or a second pushing instruction; sending the first pushing instruction to the main cache if the mobile terminal is in a first camp-on state, so as to control the main cache to push a first data volume of data of the cached content to the mobile terminal; and sending the second pushing instruction to the main cache if the mobile terminal is in a second camp-on state, so as to control the main cache to push a second data volume of data of the cached content to the mobile terminal.

With reference to the fourth aspect, in a first possible implementation manner, where the application program further comprises instructions that may be used to enable the processor and the apparatus to execute the following process:

sending a query request for a packet switching state of the mobile terminal to the gateway;

receiving reply information that is about the packet switching state and returned by the gateway; and if the packet switching state of the mobile terminal is not activated, sending a command for activating the packet switching state to a short message service center, so that the short message service center sends an SMS message to the mobile terminal according to the command for activating the packet switching state, so as to activate the packet switching state of the mobile terminal.

With reference to the fourth aspect, in a second possible implementation manner, where the application program further comprises instructions that may be used to enable the processor and the apparatus to execute the following process:

sending a uniform resource locator URL of the cached content to the mobile terminal, so that the mobile terminal acquires a description file of the cached content according to the uniform resource locator URL, determines, according to the description file, whether to agree to receive the cached content, and if agreed to receive, the mobile terminal assigns storage space to data of the cached content; and receiving a message that is sent by the mobile terminal and indicates that storage space has been assigned.

With reference to the fourth aspect, in a third possible implementation manner, where the application program further comprises an instruction that may be used to enable the processor and the apparatus to execute the following process:

obtaining, by means of screening, cached content that is in the main cache and to be pushed to the mobile terminal.

With reference to the fourth possible implementation manner, in a fifth possible implementation manner, where the application program further comprises an instruction that may be used to enable the processor and the apparatus to execute the following process:

determining, according to a mobile terminal identifier in each piece of cached content, a mobile terminal to which each piece of cached content is to be pushed.

With reference to the fifth possible implementation manner, in a sixth possible implementation manner, where the application program further comprises an instruction that may be used to enable the processor and the apparatus to execute the following process:

sending classification information of the mobile terminal to a content provider, so that the content provider marks the cached content according to the classification information, and sends cached content that is marked with a classification identifier of the mobile terminal to the main cache.

According to the data pushing method, apparatus, and system provided by the embodiments of the present invention, a corresponding data volume of cached content is pushed to a mobile terminal according to different camp-on conditions of the mobile terminal, and is cached in a cache of the mobile terminal. When a user clicks to view data, there is no need to establish a connection to a network, and the data is directly read from the cache of the mobile terminal for playing, which avoids a delay caused by buffering, thereby meeting an on-demand requirement of the user.

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiments of the present invention provide a data pushing method, where content cached in a network is pushed to a mobile terminal and cached in the mobile terminal, so that the mobile terminal does not need to establish a connection to the network when accessing video data, thereby avoiding a delay caused by buffering, and meeting an on-demand requirement of a user when the mobile terminal is used to play a video.

Figure 1:
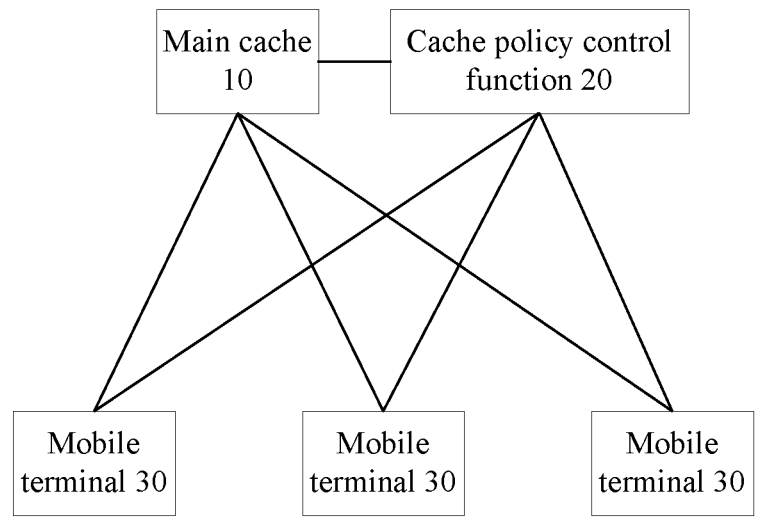
FIG. 1 is an architecture diagram of a system application of a data pushing method according to an embodiment of the present invention.

FIG. 1 is an architecture diagram of a system application of a data pushing method according to an embodiment of the present invention. It can be seen from FIG. 1 that, a system architecture in which the data pushing method provided by the embodiment of the present invention is used includes a main cache (Main Cache) 10, a cache policy control function CPCF (Cache Policy Control Function) 20, and several mobile terminals UE 30 in a network.

The main cache 10 is placed between an external network or an internal network, where the external network is a CP (Content Provider, content provider), an SP (Service Provider, service provider), or a PND (Packet Data Network, packet data network). The main cache 10 acquires content of the external network and caches a large amount of data of the acquired content. The cache policy control function 20 controls, according to different camp-on states of a mobile terminal 30, the main cache 10 to push different data volumes of data of the same cached content to the mobile terminal 30. The mobile terminal 30 has a terminal cache, which is configured to cache data that is pushed by the main cache 10 and received by the mobile terminal 30. The mobile terminal 30 locally caches a large amount of data. When a user clicks to view a video, the video can be directly played without buffering.

Figure 2:
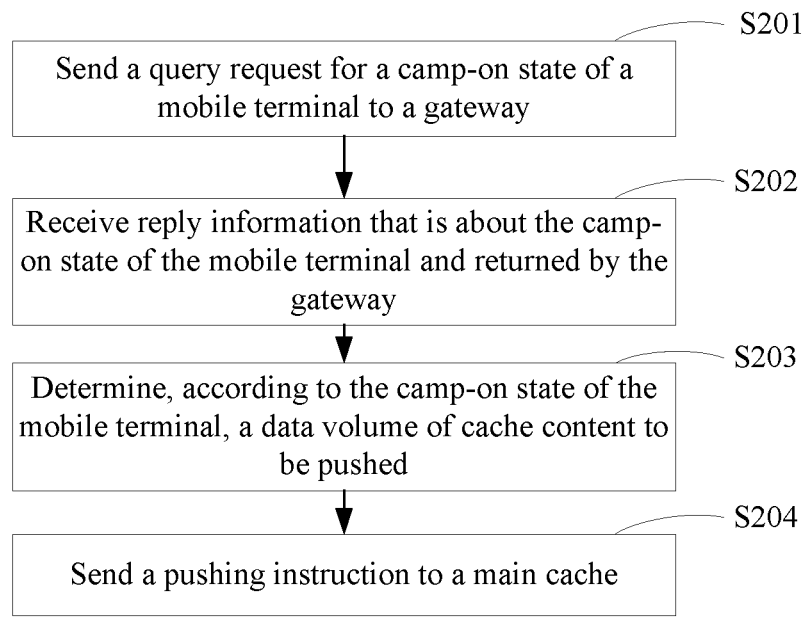
FIG. 2 is a flowchart of a data pushing method according to an embodiment of the present invention.

FIG. 2 is a flowchart of a data pushing method according to an embodiment of the present invention. In this embodiment, the data pushing method is executed by a cache policy control function, where the cache policy control function controls a main cache to push data to a mobile terminal. It can be seen from FIG. 2 that, the data pushing method includes:

Step S201: Send a query request for a camp-on state of a mobile terminal to a gateway.

Before data pushing is performed, the camp-on state of the mobile terminal needs to be queried first, and the cache policy control function determines, according to the camp-on state of the mobile terminal, a data volume of cached content to be pushed.

Step S202: Receive reply information that is about the camp-on state of the mobile terminal and returned by the gateway.

The reply information includes a queried camp-on state of the mobile terminal.

Step S203: Determine, according to the camp-on state of the mobile terminal, a data volume of cached content to be pushed.

Specifically, if the mobile terminal is in a first camp-on state, it is determined that data that is of cached content and of a first data volume is to be pushed.

Preferably, that the mobile terminal is in the first camp-on state is that the mobile terminal camps on a non-3GPP (3rd Generation Partnership Project) network. Bandwidth resources of the non-3GPP network are relatively abundant and at a low price, and low-price resources may be used to push content with relatively high quality to the mobile terminal. Therefore, when the mobile terminal camps on non-3GPP, the cache policy control function determines to push data that is corresponding to the low-compression, high-resolution, and large-volume cached content.

If the mobile terminal is in a second camp-on state, it is determined that a second data volume of data of the cached content is to be pushed.

Preferably, that the mobile terminal is in the second camp-on state is that the mobile terminal camps on a 3GPP network. Compared with bandwidth resources of another network, bandwidth resources of the 3GPP network are relatively expensive. Therefore, to achieve a purpose of saving resources and reducing costs, when the mobile terminal camps on 3GPP, the cache policy control function determines to push data that is corresponding to the low-resolution and small-volume cached content.

It should be understood that, the camp-on state of the mobile terminal is not limited to a camp-on condition in the non-3GPP network and the 3GPP network in this embodiment, and may be a camp-on condition in another network. The cache policy control function may lay down, according to a camp condition of the mobile terminal in another network, a data volume of cached content to be pushed.

Step S204: Send a pushing instruction to a main cache.

The pushing instruction is a first pushing instruction or a second pushing instruction, where the first pushing instruction is used to control the main cache to push the first data volume of data of the cached content, and the second pushing instruction is used to control the main cache to push the second data volume of data of the cached content.

Preferably, if the mobile terminal is in a non-3GPP network, the cache policy control function sends the first pushing instruction to the main cache, and the main cache pushes the data that is corresponding to the low-compression, high-resolution, and large-volume cached content to the mobile terminal according to the received first pushing instruction. If the mobile terminal is in a 3GPP network, the cache policy control function sends the second pushing instruction to the main cache, and the main cache pushes the data that is corresponding to the low-resolution and small-volume cached content to the mobile terminal according to the received second pushing instruction.

In addition, a precondition for controlling, by the cache policy control function, the main cache to push data to the mobile terminal is that a packet switching state of the mobile terminal needs to be an active state. Therefore, before step 201, the cache policy control function further needs to query whether the packet switching state of the mobile terminal is activated, and if not activated, sends an SMS message to the mobile terminal for activation by using a short message service center (SMSC, Short Message Service Center).

Figure 3:
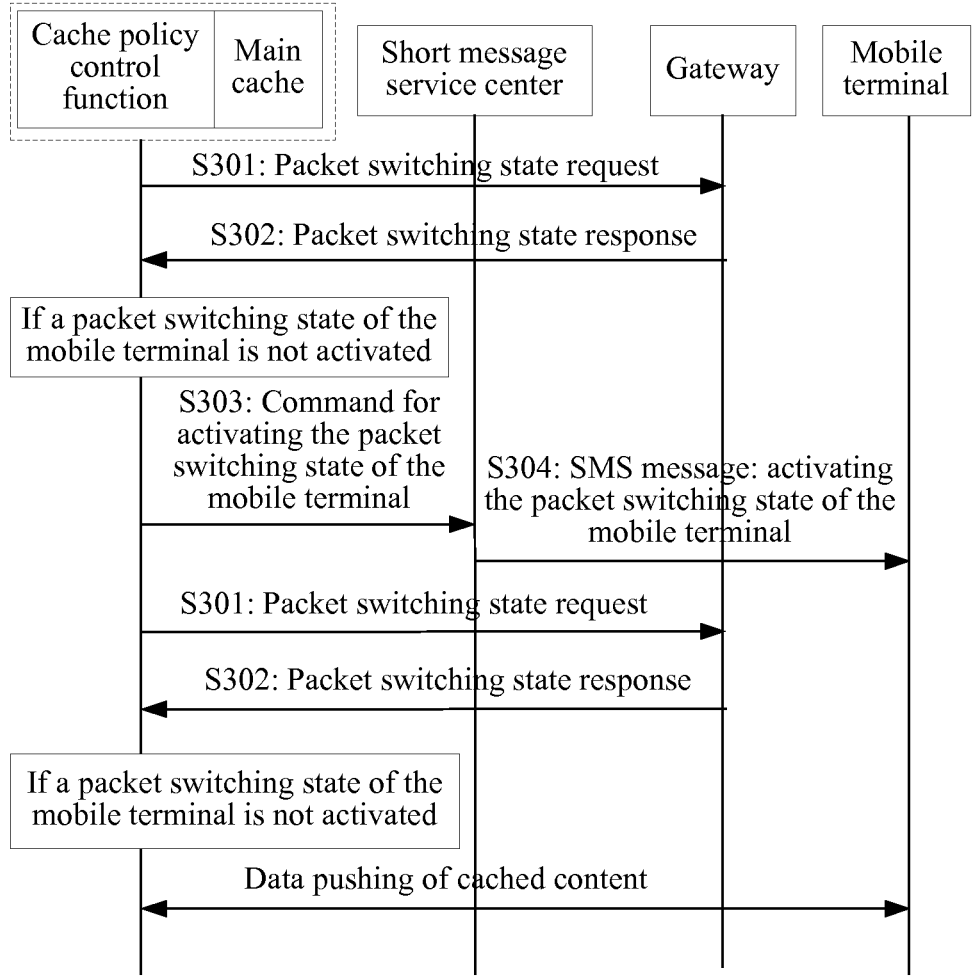
FIG. 3 is a signaling diagram of activating a packet switching state of a mobile terminal according to the embodiment of the present invention.

A specific process of querying and activating the packet switching state of the mobile terminal is shown in FIG. 3, which is a signaling diagram of activating the packet switching state of the mobile terminal according to the embodiment of the present invention.

Step S301: The cache policy control function sends a query request for the packet switching state of the mobile terminal to a gateway.

Step S302: The cache policy control function receives reply information that is about the packet switching state and returned by the gateway.

The reply information includes information about whether a queried packet switching state of the mobile terminal is the active state. If the queried packet switching state of the mobile terminal is the active state, step S201 in the data pushing method of this embodiment is performed, and there comes a data pushing process. If the queried packet switching state of the mobile terminal is an inactive state, activation is required, and step 303 is performed.

Step S303: The cache policy control function sends a command for activating the packet switching state to the short message service center.

Step S304: The short message service center receives the command for activating the packet switching state, and sends an SMS message to the mobile terminal according to the command for activating the packet switching state, so as to activate the packet switching state of the mobile terminal.

After the packet switching state of the mobile terminal is activated, the cache policy control function needs to query again whether the packet switching state of the mobile terminal is activated, and therefore step S301 is repeated.

Figure 4:
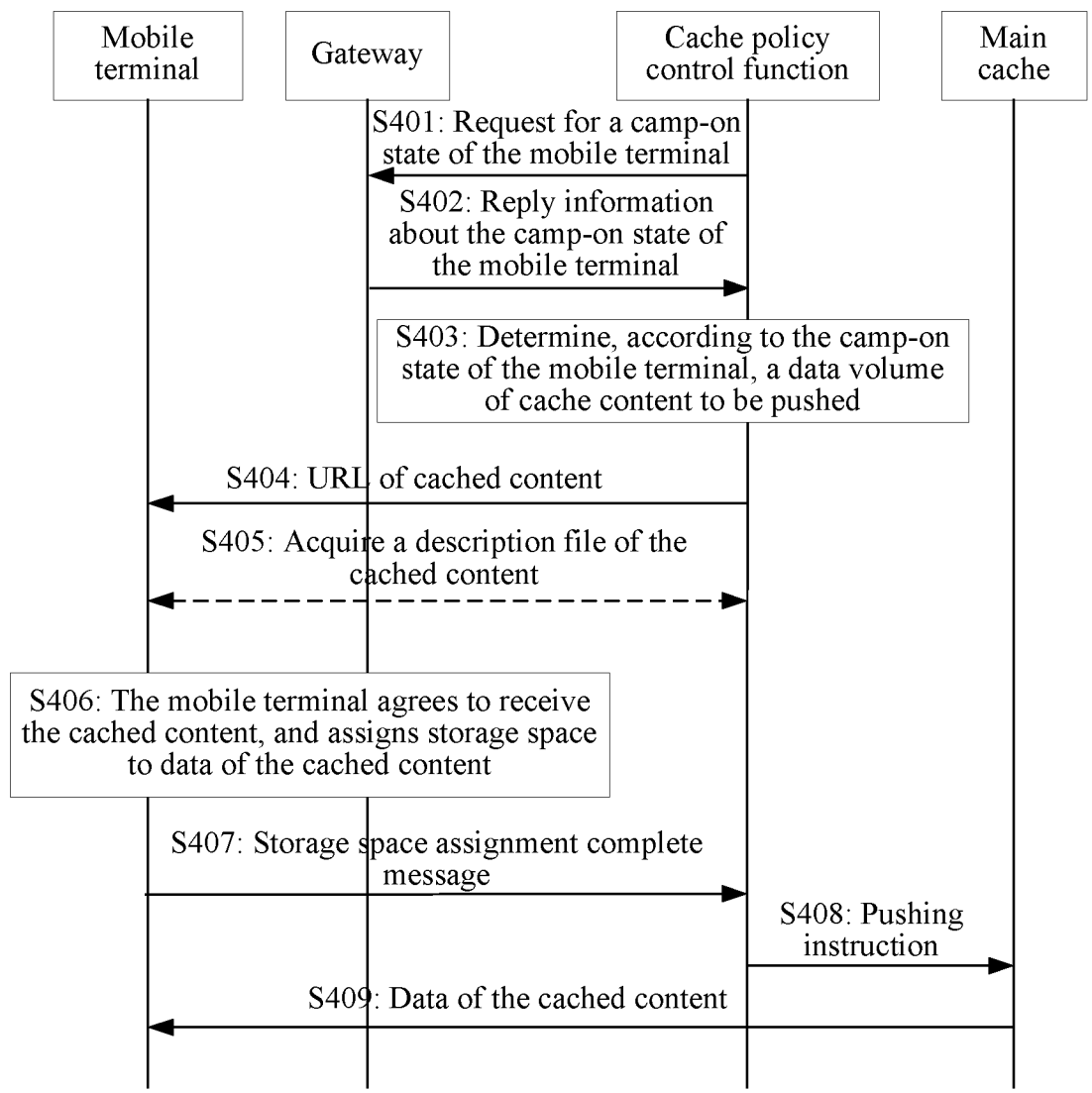
FIG. 4 is a signaling diagram of another data pushing method according to an embodiment of the present invention.

FIG. 4 is a signaling diagram of another data pushing method according to an embodiment of the present invention. It can be seen from FIG. 4 that, the data pushing method includes:

Step S401: A cache policy control function sends a query request for a camp-on state of a mobile terminal to a gateway.

Before controlling a main cache to push data to the mobile terminal, the cache policy control function needs to first query the camp-on state of the mobile terminal from the gateway, and then determine, according to different camp-on states of the mobile terminal, a data volume of cached content to be pushed.

Step S402: The cache policy control function receives reply information that is about the camp-on state of the mobile terminal and returned by the gateway.

The reply information includes a queried camp-on state of the mobile terminal.

Step S403: The cache policy control function determines, according to the camp-on state of the mobile terminal, a data volume of cached content to be pushed.

Specifically, if the mobile terminal is in a first camp-on state, it is determined that a first data volume of data of cached content is to be pushed; and if the mobile terminal is in a second camp-on state, it is determined that a second data volume of data of the cached content is to be pushed to the mobile terminal.

Preferably, when the mobile terminal camps on non-3GPP, the cache policy control function determines to push data that is corresponding to the low-compression, high-resolution, and large-volume cached content; when the mobile terminal camps on 3GPP, the cache policy control function determines to push data that is corresponding to the low-resolution and small-volume cached content.

It should be understood that, the camp-on state of the mobile terminal is not limited to a camp-on condition in the non-3GPP network and the 3GPP network in this embodiment, and may be a camp-on condition in another network. The cache policy control function may determine, according to a camp-on condition of the mobile terminal in another network, a data volume of cached content to be pushed.

Step S404: The cache policy control function sends the mobile terminal a URL (Uniform Resource Locator, uniform resource locator) of the cached content to be pushed.

Step S405: The mobile terminal acquires a description file of the cached content according to the received URL of the cached content.

The description file includes description information such as a file type, size, and language of cached content corresponding to the description file. The mobile terminal determines, according to the description information in the description file, whether to agree to receive the cached content.

Step S406: The mobile terminal agrees to receive the cached content, and then assigns storage space to data of the cached content.

Specifically, the mobile terminal has a cache, and the mobile terminal assigns space of the cache to cache the data of the cached content.

Step S407: The cache policy control function receives a message that is sent by the mobile terminal and indicates that storage space has been assigned.

After receiving a message that the mobile terminal completes storage space assignment for the cached content, the cache policy control function controls the main cache to push data corresponding to the cached content to the mobile terminal Therefore, after the cache policy control function receives the message that is sent by the mobile terminal and indicates that storage space has been assigned, the following steps are performed.

Step S408: The cache policy control function sends a pushing instruction to a main cache.

The pushing instruction is a first pushing instruction or a second pushing instruction, where the first pushing instruction is used to control the main cache to push the first data volume of data of the cached content, and the second pushing instruction is used to control the main cache to push the second data volume of data of the cached content. Each pushing instruction includes a URL of cached content. The main cache finds corresponding cached content according to the URL of the cached content in the pushing instruction, and searches for and pushes a corresponding data volume of data of the cached content according to the pushing instruction.

Preferably, if the mobile terminal is in a non-3GPP network, the cache policy control function sends the first pushing instruction to the main cache, so as to control the main cache to search for corresponding cached content according to a URL of cached content in the received first pushing instruction, and then push the low-compression, high-resolution and large-volume data that is corresponding to the cached content to the mobile terminal. If the mobile terminal is in a 3GPP network, the cache policy control function sends the second pushing instruction to the main cache, so as to control the main cache to search for corresponding cached content according to a URL of cached content in the received second pushing instruction, and then push the low-resolution and small-volume data that is corresponding to the cached content to the mobile terminal.

Step S409: The main cache pushes the data of the cached content to the mobile terminal.

Specifically, if the main cache receives the first pushing instruction, low-compression, high-resolution, and large-volume data of the cached content corresponding to the URL of the cached content in the first pushing instruction is pushed to the mobile terminal. If the main cache receives the second pushing instruction, low-resolution and small-volume data of the cached content corresponding to the URL of the cached content in the second pushing instruction is pushed to the mobile terminal. The mobile terminal caches received data in a cache in which storage space has been pre-assigned, so as to meet an on-demand requirement of a user.

Figure 5:
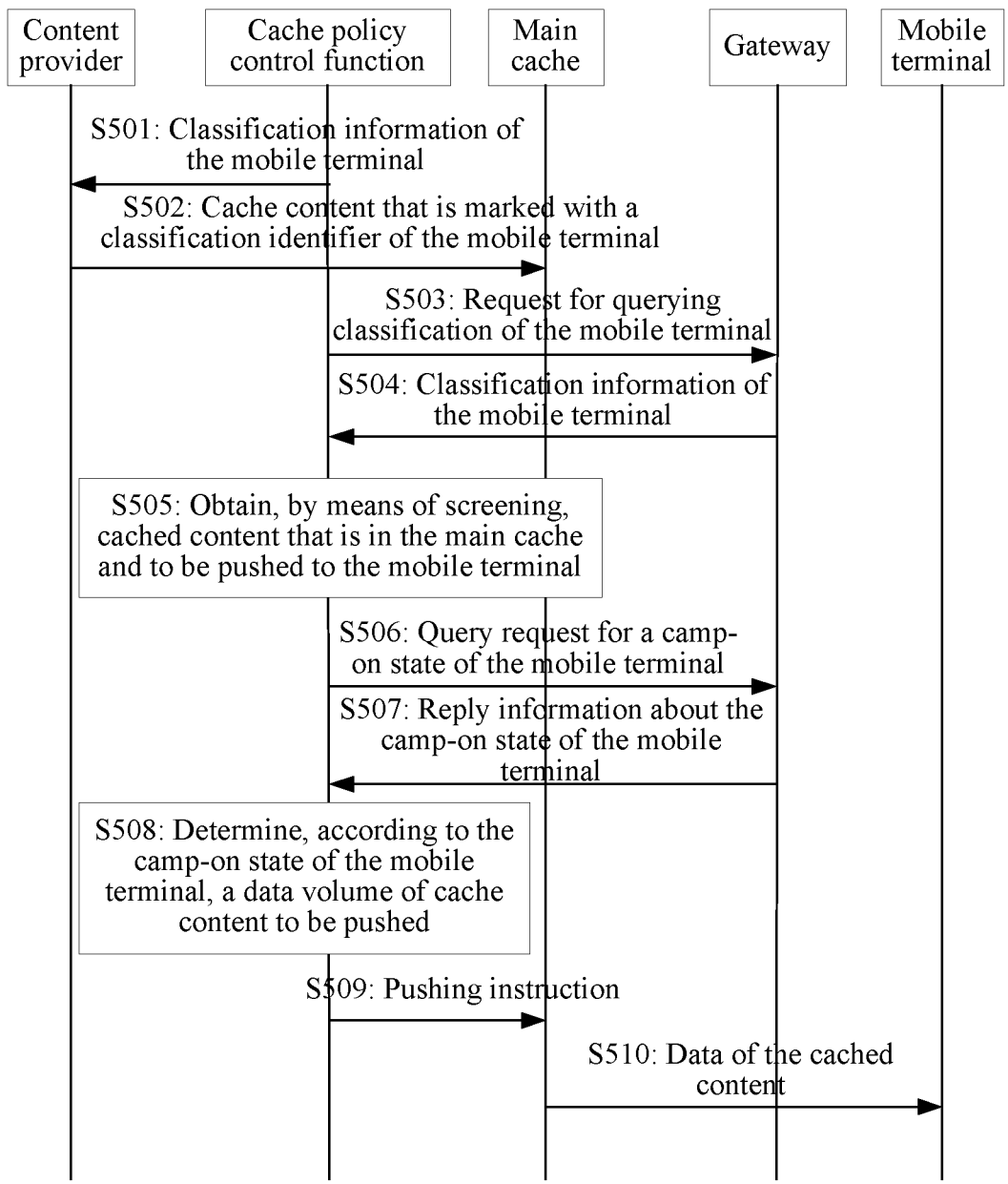
FIG. 5 is a signaling diagram of still another data pushing method according to an embodiment of the present invention.

FIG. 5 is a signaling diagram of still another data pushing method according to an embodiment of the present invention. It can be seen from FIG. 5 that, the data pushing method includes:

Step S501: A cache policy control function sends classification information of a mobile terminal to a content provider.

The classification information includes classification information of the mobile terminal in different dimensions.

Preferably, by age, mobile terminals are classified into early youth, youth, middle age, and old age. By gender, mobile terminals are classified into female and male.

It should be understood that, classification of mobile terminals is not limited to the foregoing classification manners, and mobile terminals may be classified according to different dimensions or different requirements.

After receiving the classification information of the mobile terminal, the content provider marks cached content according to the classification information of the mobile terminal in different dimensions.

Preferably, according to the classification by age, the content provider marks a cartoon, a book of fairy tales, a toy, and other related content with an "early youth" identifier; marks an electronic game, a pop concert, and other related content with a "youth" identifier; marks news, current affairs, a sports competition, and other related content with a "middle age" identifier; and marks heath preserving, medical treatment, entertainment, and other related content with an "old age" identifier. According to the classification by gender, the content provider marks a game, sports, science and technology, politics, and other related content with a "male" identifier; and marks clothes, makeup, living, and other related content with a "female" identifier.

It should be understood that, the content provider may mark the cached content with different identifiers according to different classification manners of the mobile terminal, and a same piece of cached content may be marked with multiple identifiers.

Step S502: The content provider pushes cached content that is marked with a classification identifier of the mobile terminal to a main cache.

The main cache caches a large amount of cached content pushed by the content provider, and the cached content is marked with a classification identifier of a mobile terminal, so as to determine a suitable mobile terminal to which the cached content is to be pushed.

Step S503: The cache policy control function sends a request for querying classification of the mobile terminal to a gateway.

To ensure that suitable cached content is pushed to a suitable mobile terminal, a classification condition of a mobile terminal needs to be queried before pushing.

Step S504: The cache policy control function receives the classification information of the mobile terminal returned by the gateway.

Step S505: The cache policy control function screens cached content in the main cache.

Specifically, first, the cache policy control function performs matching between the received classification information of the mobile terminal and a mark of the cached content in the main cache, and determines a mobile terminal to which each piece of cached content is to be pushed, and then obtains, by means of screening and according to a matching result, easy-to-use cached content that has a relatively high click-through rate for each mobile terminal. Screening of cache data makes that cached content that is in common use and suitable for a mobile terminal is preferentially pushed to the mobile terminal.

Step S506: The cache policy control function sends a query request for a camp-on state of the mobile terminal to the gateway.

Before controlling the main cache to push data to the mobile terminal, the cache policy control function needs to first query the camp-on state of the mobile terminal from the gateway, and then determine, according to different camp-on states of the mobile terminal, a data volume of cached content to be pushed.

Step S507: The cache policy control function receives reply information that is about the camp-on state of the mobile terminal and returned by the gateway.

The reply information includes a queried camp-on state of the mobile terminal.

Step S508: The cache policy control function determines, according to the camp-on state of the mobile terminal, a data volume of cached content to be pushed.

Specifically, if the mobile terminal is in a first camp-on state, it is determined that data that is of cached content and of a first data volume is to be pushed; if the mobile terminal is in a second camp-on state, it is determined that a second data volume of data of the cached content is to be pushed to the mobile terminal.

Preferably, when the mobile terminal camps on non-3GPP, the cache policy control function determines to push low-compression, high-resolution, and large-volume data that is corresponding to the cached content; when the mobile terminal camps on 3GPP, the cache policy control function determines to push low-resolution and small-volume data that is corresponding to the cached content.

It should be understood that, the camp-on state of the mobile terminal is not limited to a camp-on condition in the non-3GPP network and the 3GPP network in this embodiment, and may be a camp-on condition in another network. The cache policy control function may determine, according to a camp-on condition of the mobile terminal in another network, a data volume of cached content to be pushed.

Step S509: The cache policy control function sends a pushing instruction to the main cache.

The pushing instruction is a first pushing instruction or a second pushing instruction, where the first pushing instruction is used to control the main cache to push the first data volume of data of the cached content, and the second pushing instruction is used to control the main cache to push the second data volume of data of the cached content. Each pushing instruction includes a URL of cached content. The main cache finds corresponding cached content according to the URL of the cached content in the pushing instruction, and searches for and pushes a corresponding data volume of data of the cached content according to the pushing instruction.

Specifically, if the mobile terminal is in a non-3GPP network, the cache policy control function sends the first pushing instruction to the main cache, so as to control the main cache to search for corresponding cached content according to a URL of cached content in the received first pushing instruction, and then push the low-compression, high-resolution, and large-volume data that is corresponding to the cached content to the mobile terminal. If the mobile terminal is in a 3 GPP network, the cache policy control function sends the second pushing instruction to the main cache, so as to control the main cache to search for corresponding cached content according to a URL of cached content in the received second pushing instruction, and then push the low-resolution and small-volume data that is corresponding to the cached content to the mobile terminal.

Step S510: The main cache pushes data of the cached content to the mobile terminal.

Specifically, if the main cache receives the first pushing instruction, low-compression, high-resolution, and large-volume data of the cached content corresponding to the URL of the cached content in the first pushing instruction is pushed to the mobile terminal. If the main cache receives the second pushing instruction, low-resolution and small-volume data of the cached content corresponding to the URL of the cached content in the second pushing instruction is pushed to the mobile terminal. The mobile terminal caches received data in a cache in which storage space has been pre-assigned, so as to meet an on-demand requirement of a user.

Figure 6:
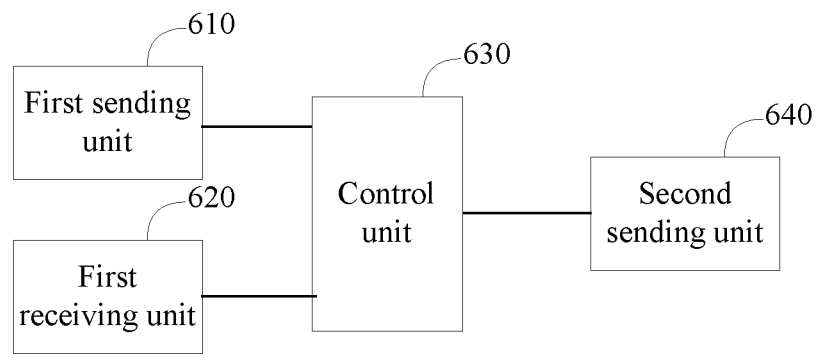
FIG. 6 is a schematic structural diagram of a data pushing apparatus according to an embodiment of the present invention.

Correspondingly, an embodiment of the present invention provides a data pushing apparatus. As shown in FIG. 6, FIG. 6 is a schematic structural diagram of the data pushing apparatus according to the embodiment of the present invention. The data pushing apparatus includes: a first sending unit 610, a first receiving unit 620, a control unit 630, and a second sending unit 640.

The first sending unit 610 is configured to send a query request for a camp-on state of a mobile terminal to a gateway.

Before data pushing is performed, the camp-on state of the mobile terminal needs to be queried first, and the cache policy control function determines, according to the camp-on state of the mobile terminal, a data volume of cached content to be pushed.

The first receiving unit 620 is configured to receive reply information that is about the camp-on state of the mobile terminal and returned by the gateway.

The reply information includes a queried camp-on state of the mobile terminal.

The control unit 630 is configured to determine, according to the camp-on state of the mobile terminal, a data volume of cached content to be pushed.

Specifically, if the mobile terminal is in a first camp-on state, the control unit 630 determines to push a first data volume of data of cached content; if the mobile terminal is in a second camp-on state, the control unit 630 determines to push a second data volume of data of the cached content.

Preferably, that the mobile terminal is in the first camp-on state is that the mobile terminal camps on a non-3GPP network. Bandwidth resources of the non-3GPP network are relatively abundant and at a low price, and low-price resources may be used to push content with relatively high quality to the mobile terminal. Therefore, when the mobile terminal camps on non-3GPP, the control unit 630 determines to push low-compression, high-resolution, and large-volume data that is corresponding to the cached content. That the mobile terminal is in the second camp-on state is that the mobile terminal camps on a 3GPP network. Compared with bandwidth resources of another network, bandwidth resources of the 3GPP network are relatively expensive. Therefore, to achieve a purpose of saving resources and reducing costs, when the mobile terminal camps on 3GPP, the control unit 630 determines to push low-resolution and small-volume data that is corresponding to the cached content.

It should be understood that, the camp-on state of the mobile terminal is not limited to a camp-on condition in the non-3GPP network and the 3GPP network in this embodiment, and may be a camp-on condition in another network. The control unit 630 may lay down, according to a camp-on condition of the mobile terminal in another network, a data volume of cached content to be pushed.

The second sending unit 640 is configured to send a pushing instruction to a main cache.

The pushing instruction is a first pushing instruction or a second pushing instruction, where the first pushing instruction is used to control the main cache to push the first data volume of data of the cached content, and the second pushing instruction is used to control the main cache to push the second data volume of data of the cached content.

Preferably, if the mobile terminal is in a non-3GPP network, the second sending unit 640 sends the first pushing instruction to the main cache, and the main cache pushes the low-compression, high-resolution, and large-volume data that is corresponding to the cached content to the mobile terminal according to the received first pushing instruction. If the mobile terminal is in a 3GPP network, the second sending unit 640 sends the second pushing instruction to the main cache, and the main cache pushes the low-resolution and small-volume data that is corresponding to the cached content to the mobile terminal according to the received second pushing instruction.

Figure 7:
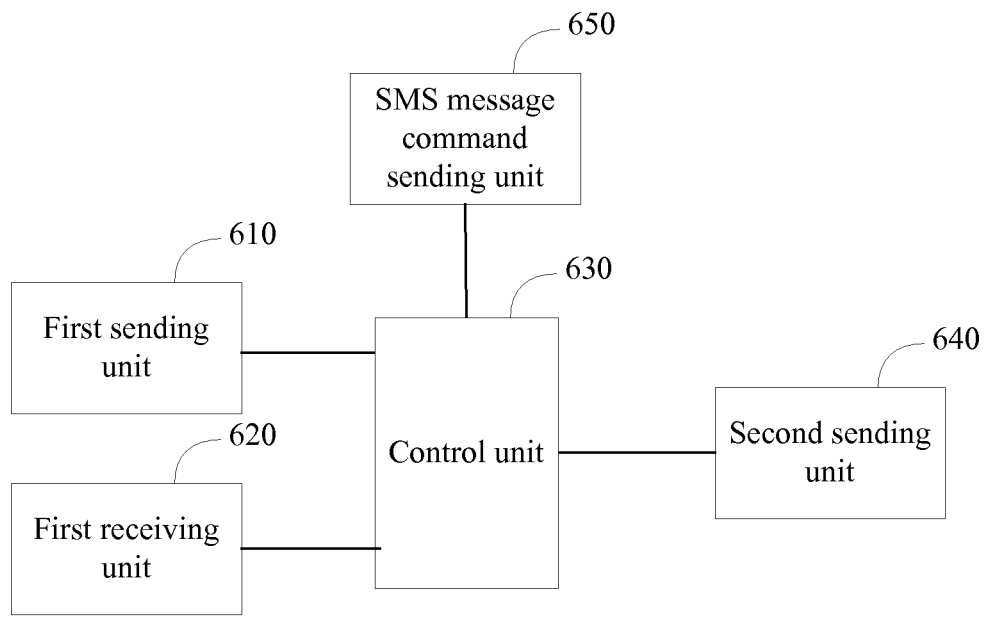
FIG. 7 is a schematic structural diagram of a data pushing apparatus with an SMS message command sending unit according to an embodiment of the present invention.

In addition, a precondition for using the data pushing apparatus to control the main cache to push data to the mobile terminal is that a packet switching state of the mobile terminal needs to be an active state. Therefore, the data pushing apparatus further includes an SMS message sending unit 650. As shown in FIG. 7, FIG. 7 is a schematic structural diagram of a data pushing apparatus with an SMS message command sending unit according to an embodiment of the present invention.

The first sending unit 610 is further configured to send a query request for a packet switching state of the mobile terminal to the gateway.

The first receiving unit 620 is further configured to receive reply information that is about the packet switching state and returned by the gateway.

The reply information includes information about whether a queried packet switching state of the mobile terminal is the active state. If the queried packet switching state of the mobile terminal is the active state, the first sending unit sends a query request for the camp-on state of the mobile terminal to the gateway, and there comes a data pushing process. If the queried packet switching state of the mobile terminal is in an inactive state, activation is required.

The SMS message command sending unit 650 is configured to send a command for activating the packet switching state to a short message service center.

Specifically, when the packet switching state of the mobile terminal is not activated, the SMS message sending unit 650 sends the command for activating the packet switching state to the short message service center, so that the short message service center sends an SMS message to the mobile terminal according to the command for activating the packet switching state, so as to activate the packet switching state of the mobile terminal.

Figure 8:
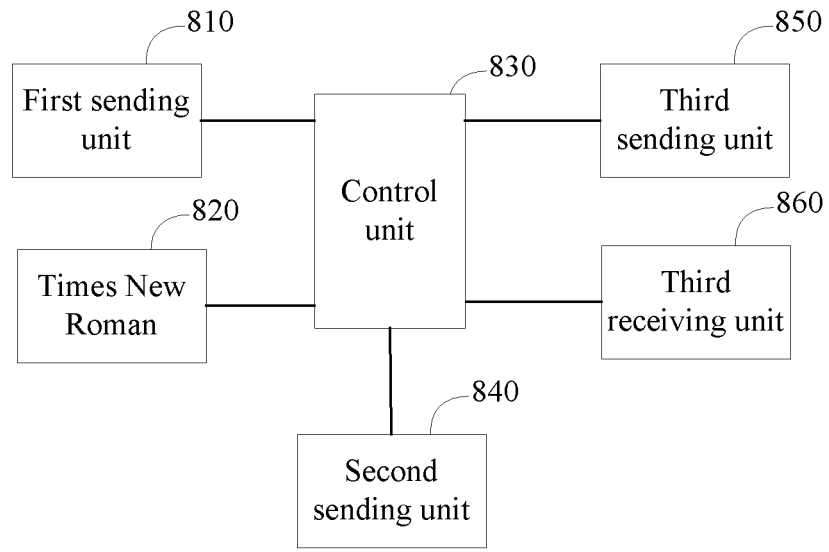
FIG. 8 is a schematic structural diagram of another data pushing apparatus according to an embodiment of the present invention.

FIG. 8 is a schematic structural diagram of another data pushing apparatus according to an embodiment of the present invention. As shown in FIG. 8, the data pushing apparatus includes: a first sending unit 810, a first receiving unit 820, a control unit 830, a second sending unit 840, a third sending unit 850, and a third receiving unit 860.

The first sending unit 810 is configured to send a query request for a camp-on state of a mobile terminal to a gateway.

Before data pushing is performed, the camp-on state of the mobile terminal needs to be queried first, and then a data volume of cached content to be pushed is determined according to the camp-on state of the mobile terminal.

The first receiving unit 820 is configured to receive reply information that is about the camp-on state of the mobile terminal and returned by the gateway.

The reply information includes a queried camp-on state of the mobile terminal.

The control unit 830 is configured to determine, according to the camp-on state of the mobile terminal, a data volume of cached content to be pushed.

Specifically, if the mobile terminal is in a first camp-on state, the control unit 830 determines to push a first data volume of data of cached content; and if the mobile terminal is in a second camp-on state, the control unit 830 determines to push a second data volume of data of the cached content to the mobile terminal.

Preferably, when the mobile terminal camps on non-3GPP, the control unit 830 determines to push low-compression, high-resolution, and large-volume data that is corresponding to the cached content; when the mobile terminal camps on 3GPP, the control unit 830 determines to push low-resolution and small-volume data that is corresponding to the cached content.

It should be understood that, the camp-on state of the mobile terminal is not limited to a camp-on condition in the non-3GPP network and the 3GPP network in this embodiment, and may be a camp-on condition in another network. The control unit 830 may determine, according to a camp-on condition of the mobile terminal in another network, a data volume of cached content to be pushed.

The third sending unit 850 is configured to send a uniform resource locator URL of the cached content to the mobile terminal.

The mobile terminal acquires a description file of the cached content according to the uniform resource locator URL, determines, according to the description file, whether to agree to receive the cached content, and if agreed to receive, the mobile terminal assigns storage space to data of the cached content.

The third receiving unit 860 is configured to receive a message that is sent by the mobile terminal and indicates that storage space has been assigned.

The second sending unit 640 is configured to send a pushing control instruction to a main cache.

The pushing instruction is a first pushing instruction or a second pushing instruction, where the first pushing instruction is corresponding to that the mobile terminal is in the first camp-on state, and the second pushing instruction is corresponding to that the mobile terminal is in the second camp-on state. Each pushing instruction includes a URL of cached content. The main cache finds corresponding cached content according to the URL of the cached content in the pushing instruction, and searches for and pushes a corresponding data volume of data of the cached content according to the pushing instruction.

Specifically, if the mobile terminal is in a non-3GPP network, the second sending unit 640 sends the first pushing instruction to the main cache, so as to control the main cache to search for corresponding cached content according to a URL of cached content in the received first pushing instruction, and then push the low-compression, high-resolution, and large-volume data that is corresponding to the cached content to the mobile terminal. If the mobile terminal is in a 3GPP network, the second sending unit 640 sends the second pushing instruction to the main cache, so as to control the main cache to search for corresponding cached content according to a URL of cached content in the received second pushing instruction, and then push the low-resolution and small-volume data that is corresponding to the cached content to the mobile terminal.

Figure 9:
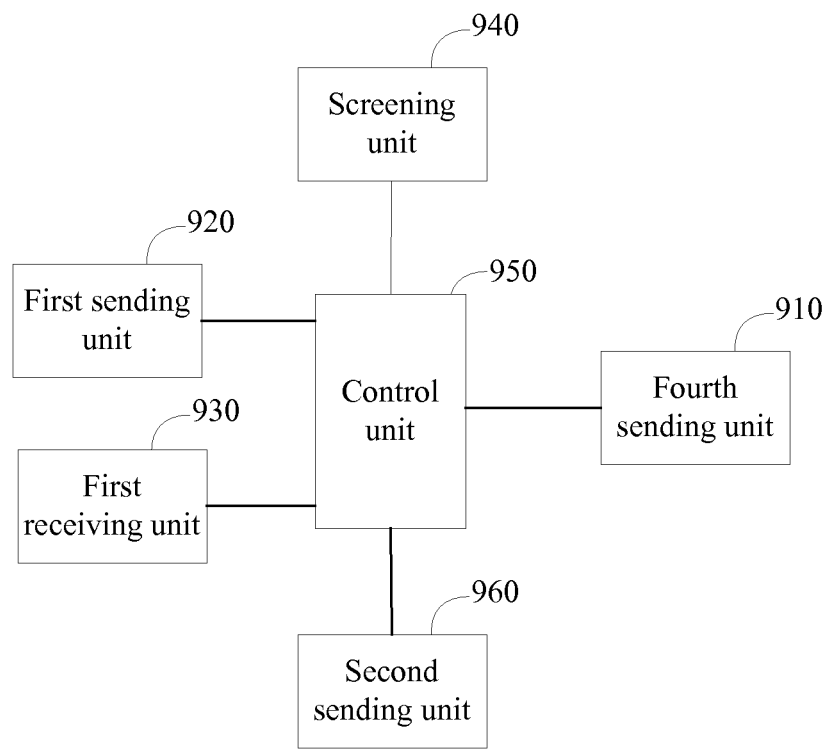
FIG. 9 is a schematic structural diagram of still another data pushing apparatus according to an embodiment of the present invention.

FIG. 9 is a schematic structural diagram of still another data pushing apparatus according to an embodiment of the present invention. As shown in FIG. 9, the data pushing apparatus includes: a fourth sending unit 910, a first sending unit 920, a first receiving unit 930, a screening unit 940, a control unit 950, and a second sending unit 960.

The fourth sending unit 910 is configured to send classification information of a mobile terminal to a content provider.

The classification information includes classification information of the mobile terminal in different dimensions.

Preferably, by age, mobile terminals are classified into early youth, youth, middle age, and old age. By gender, mobile terminals are classified into female and male.

It should be understood that, classification of mobile terminals is not limited to the foregoing classification manners, and mobile terminals may be classified according to different dimensions or different requirements.

After receiving the classification information of the mobile terminal, the content provider marks cached content according to the classification information of the mobile terminal in different dimensions.

Preferably, according to the classification by age, the content provider marks a cartoon, a book of fairy tales, a toy, and other related content with an "early youth" identifier; marks an electronic game, a pop concert, and other related content with a "youth" identifier; marks news, current affairs, a sports competition, and other related content with a "middle age" identifier; and marks heath preserving, medical treatment, entertainment, and other related content with an "old age" identifier. According to the classification by gender, the content provider marks a game, sports, science and technology, politics, and other related content with a "male" identifier; and marks clothes, makeup, living, and other related content with a "female" identifier.

It should be understood that, the content provider may mark the cached content with different identifiers according to different classification manners of the mobile terminal, and a same piece of cached content may be marked with multiple identifiers.

The content provider pushes cached content that is marked with a classification identifier of the mobile terminal to a main cache.

The first sending unit 920 is configured to send a request for querying classification of the mobile terminal to a gateway.

The first receiving unit 930 is configured to receive the classification information of the mobile terminal returned by the gateway.

The screening unit 940 is configured to screen cached content in the main cache.

Specifically, first, the screening unit 940 performs matching between the received classification information of the mobile terminal and a mark of the cached content in the main cache, and determines a mobile terminal to which each piece of cached content is to be pushed, and then obtains, by means of screening and according to a matching result, easy-to-use cached content that has a relatively high click-through rate for each mobile terminal. Screening of cache data makes that cached content that is in common use and suitable for a mobile terminal is preferentially pushed to the mobile terminal.

The first sending unit 920 is further configured to send a query request for a camp-on state of the mobile terminal to the gateway.

The first receiving unit 930 is further configured to receive reply information that is about the camp-on state of the mobile terminal and returned by the gateway.

The control unit 950 is configured to determine, according to the camp-on state of the mobile terminal, a data volume of cached content to be pushed.

Specifically, if the mobile terminal is in a first camp-on state, the control unit 950 determines to push a first data volume of data of cached content; if the mobile terminal is in a second camp-on state, the control unit 950 determines to push a second data volume of data of the cached content to the mobile terminal.

Preferably, when the mobile terminal camps on non-3GPP, the control unit 950 determines to push low-compression, high-resolution, and large-volume data that is corresponding to the cached content; when the mobile terminal camps on 3GPP, the control unit 950 determines to push low-resolution and small-volume data that is corresponding to the cached content.

It should be understood that, the camp-on state of the mobile terminal is not limited to a camp-on condition in the non-3GPP network and the 3GPP network in this embodiment, and may be a camp-on condition in another network. The control unit 950 may determine, according to a camp-on condition of the mobile terminal in another network, a data volume of cached content to be pushed.

The second sending unit 960 is configured to send a pushing instruction to the main cache.

The pushing instruction is a first pushing instruction or a second pushing instruction, where the first pushing instruction is corresponding to that the mobile terminal is in the first camp-on state, and the second pushing instruction is corresponding to that the mobile terminal is in the second camp-on state. Each pushing instruction includes a URL of cached content. The main cache finds corresponding cached content according to the URL of the cached content in the pushing instruction, and searches for and pushes a corresponding data volume of data of the cached content according to the pushing instruction.

Specifically, if the mobile terminal is in a non-3GPP network, the second sending unit 960 sends the first pushing instruction to the main cache, so as to control the main cache to search for corresponding cached content according to a URL of cached content in the received first pushing instruction, and then push the low-compression, high-resolution, and large-volume data that is corresponding to the cached content to the mobile terminal. If the mobile terminal is in a 3 GPP network, the second sending unit 960 sends the second pushing instruction to the main cache, so as to control the main cache to search for corresponding cached content according to a URL of cached content in the received second pushing instruction, and then push the low-resolution and small-volume data that is corresponding to the cached content to the mobile terminal.

Figure 10:
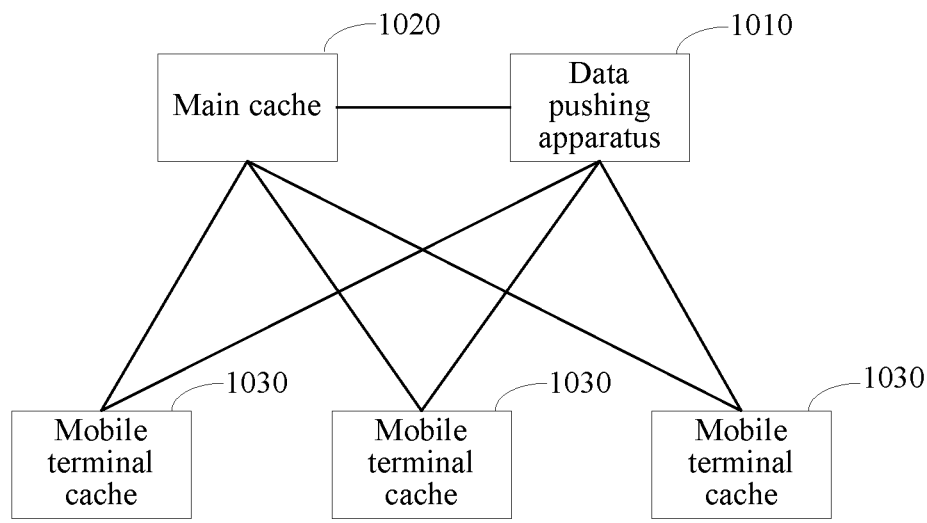
FIG. 10 is a schematic structural diagram of a data pushing system according to an embodiment of the present invention.

As shown in FIG. 10, FIG. 10 is a schematic structural diagram of a data pushing system according to an embodiment of the present invention.

The data pushing system includes a data pushing apparatus 1010, a main cache 1020, and a mobile terminal cache 1030.

The data pushing apparatus 1010 is configured to send a query request for a camp-on state of a mobile terminal to a gateway; receive reply information that is about the camp-on state of the mobile terminal and returned by the gateway, where the reply information includes the camp-on state of the mobile terminal; determine, according to the camp-on state of the mobile terminal, a data volume of cached content to be pushed; and send a pushing instruction to the main cache, where the pushing instruction is a first pushing instruction or a second pushing instruction; the first pushing instruction is sent to the main cache if the mobile terminal is in a first camp-on state, so as to control the main cache to push a first data volume of data of the cached content to the mobile terminal; and the second pushing instruction is sent to the main cache if the mobile terminal is in a second camp-on state, so as to control the main cache to push a second data volume of data of the cached content to the mobile terminal.

The main cache 1020 is configured to cache cached content from the outside of a network, and push data of the cached content to the mobile terminal according to the pushing instruction sent by the data pushing apparatus.

The mobile terminal cache 1030 is configured to cache data that is pushed by the main cache and received by the mobile terminal.

Figure 11:
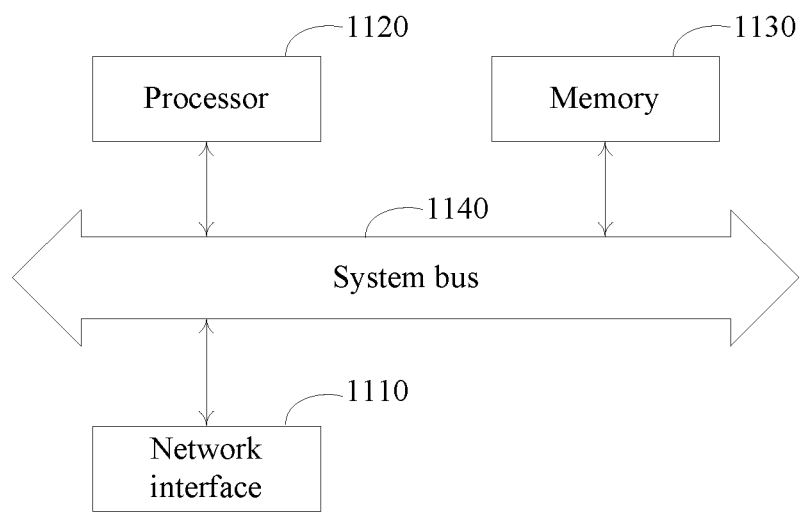
FIG. 11 is a schematic diagram of a data pushing apparatus according to an embodiment of the present invention.

As shown in FIG. 11, FIG. 11 is a schematic diagram of a data pushing apparatus according to an embodiment of the present invention. The apparatus includes a network interface 1110, a processor 1120, and a memory 1130. A system bus 1140 is configured to connect the network interface 1110, the processor 1120, and the memory 1130.

The network interface 1110 is configured to communicate with a terminal of the Internet of Things, an access gateway of the Internet of Things, a bearer network, a serving gateway of the Internet of Things, and an application server.

The memory 1130 may be a permanent memory, for example, a hard disk drive and a flash memory, and the memory 1130 has a software module and a device driver. The software module can execute various functional modules of the foregoing methods in the present invention; and the device driver may be a network driver and an interface driver.

Upon startup, these software components are loaded into the memory 1130 and then are accessed by the processor 1120 to execute the following instructions:

sending a query request for a camp-on state of a mobile terminal to a gateway;

receiving reply information that is about the camp-on state of the mobile terminal and returned by the gateway, where the reply information includes the camp-on state of the mobile terminal;

determining, according to the camp-on state of the mobile terminal, a data volume of cached content to be pushed; and sending a pushing instruction to a main cache, where the pushing instruction is a first pushing instruction or a second pushing instruction; sending the first pushing instruction to the main cache if the mobile terminal is in a first camp-on state, so as to control the main cache to push a first data volume of data of the cached content to the mobile terminal; and sending the second pushing instruction to the main cache if the mobile terminal is in a second camp-on state, so as to control the main cache to push a second data volume of data of the cached content to the mobile terminal.

The data pushing apparatus of this embodiment instructs the main cache to push data in the main cache to the mobile terminal, and the data is saved in a cache of the mobile terminal, so that when a user clicks a video that needs to be viewed, an on-demand requirement of the user is met without buffering.

Further, after accessing a software component of the memory 1130, the processor executes instructions of the following process:

sending a query request for a packet switching state of the mobile terminal to the gateway;

receiving reply information that is about the packet switching state and returned by the gateway; and if the packet switching state of the mobile terminal is not activated, sending a command for activating the packet switching state to a short message service center, so that the short message service center sends an SMS message to the mobile terminal according to the command for activating the packet switching state, so as to activate the packet switching state of the mobile terminal.

Before the data pushing apparatus performs a process of controlling the main cache to push data to the mobile terminal, the foregoing instruction process is used to activate the packet switching state of the mobile terminal, so that the main cache pushes the data to the mobile terminal.

Further, after accessing a software component of the memory 1130, the processor executes instructions of the following process:

sending a uniform resource locator URL of the cached content to the mobile terminal, so that the mobile terminal acquires a description file of the cached content according to the uniform resource locator URL, determines, according to the description file, whether to agree to receive the cached content, and if agreed to receive, the mobile terminal assigns storage space to data of the cached content; and receiving a message that is sent by the mobile terminal and indicates that storage space has been assigned.

Before the data pushing apparatus performs a process of controlling the main cache to push data to the mobile terminal, the foregoing instruction process is used to control the mobile terminal to assign storage space to cached content data to be received.

Further, after accessing a software component of the memory 1130, the processor executes instructions of the following process:

sending classification information of the mobile terminal to a content provider, so that the content provider marks the cached content according to the classification information, and sends cached content that is marked with a classification identifier of the mobile terminal to the main cache;

determining, according to a mobile terminal identifier in each piece of cached content, a mobile terminal to which each piece of cached content is to be pushed; and obtaining, by means of screening, cached content that is in the main cache and to be pushed to the mobile terminal.

Before the data pushing apparatus performs a process of controlling the main cache to push data to the mobile terminal, the foregoing instruction process is used to select cached content that is in common use and suitable for the mobile terminal, so as to preferentially push the cached content to a corresponding mobile terminal.

In the present invention, by viewing a camp-on state of a mobile terminal and according to different camp-on states of the mobile terminal, a main cache may be controlled to send different data volumes of data of the same content. In this way, network resources of different networks are effectively utilized, and costs of data pushing are effectively reduced.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A data pushing method, comprising:
sending a query request for a camp-on state of a mobile terminal on a network to a gateway;
receiving reply information that is about the camp-on state of the mobile terminal and returned by the gateway, wherein the reply information comprises the camp-on state of the mobile terminal;
determining, according to the camp-on state of the mobile terminal, a data volume of cached content to be pushed; and
sending a pushing instruction to a main cache, wherein the pushing instruction is a first pushing instruction or a second pushing instruction; sending the first pushing instruction to the main cache if the mobile terminal is in a first camp-on state, so as to control the main cache to push a first data volume of data of the cached content to the mobile terminal; and sending the second pushing instruction to the main cache if the mobile terminal is in a second camp-on state, so as to control the main cache to push a second data volume of data of the cached content to the mobile terminal.

2. The method according to claim 1, wherein the sending the first pushing instruction to the main cache if the mobile terminal is in a first camp-on state, so as to control the main cache to push a first data volume of data of the cached content to the mobile terminal comprises:
if the mobile terminal camps on a non-3rd Generation Partnership Project (3GPP) network, sending the first pushing instruction to the main cache, so as to control the main cache to push low-compression, high-resolution, and large-volume data of the cached content to the mobile terminal.

3. The method according to claim 1, wherein the sending the second pushing instruction to the main cache if the mobile terminal is in a second camp-on state, so as to control the main cache to push a second data volume of data of the cached content to the mobile terminal comprises:
if the mobile terminal camps on a 3rd Generation Partnership Project (3GPP) network, sending the second pushing instruction to the main cache, so as to control the main cache to push low-resolution and small-volume data of the cached content to the mobile terminal.

4. The method according to claim 1, wherein before the sending a query request for a camp-on state of a mobile terminal on a network to a gateway, the method further comprises:
sending a query request for a packet switching state of the mobile terminal to the gateway;
receiving reply information that is about the packet switching state and returned by the gateway; and
if the packet switching state of the mobile terminal is not activated, sending a command for activating the packet switching state to a short message service center, so that the short message service center sends an SMS message to the mobile terminal according to the command for activating the packet switching state, so as to activate the packet switching state of the mobile terminal.

5. The method according to claim 1, wherein after the determining, according to the camp-on state of the mobile terminal, a data volume of cached content to be pushed, and before the sending a pushing instruction to a main cache, the method further comprises:
sending a uniform resource locator URL of the cached content to the mobile terminal, so that the mobile terminal acquires a description file of the cached content according to the uniform resource locator URL, determines, according to the description file, whether to agree to receive the cached content, and if agreed to receive, the mobile terminal assigns storage space to data of the cached content; and receiving a message that is sent by the mobile terminal and indicates that storage space has been assigned.

6. The method according to claim 5, wherein the pushing instruction comprises the uniform resource locator URL of the cached content, so that the main cache searches for corresponding cached content according to the uniform resource locator URL of the cached content.

7. The method according to claim 1, wherein before the sending a query request for a camp-on state to a mobile terminal, the method further comprises:

obtaining, by means of screening, cached content that is in the main cache and to be pushed to the mobile terminal.

8. The method according to claim 7, wherein before the obtaining, by means of screening, cached content that is in the main cache and to be pushed to the mobile terminal, the method comprises:

determining, according to a mobile terminal identifier in each piece of cached content, a mobile terminal to which each piece of cached content is to be pushed.

9. The method according to claim 8, wherein before the determining, according to a mobile terminal identifier in the cached content, a mobile terminal to which the cached content is to be pushed, the method further comprises:

sending classification information of the mobile terminal to a content provider, so that the content provider marks the cached content according to the classification information, and sends cached content that is marked with a classification identifier of the mobile terminal to the main cache.

10. A data pushing apparatus, comprising:
a memory; and
a processor coupled to the memory and configured to:
send a query request for a camp-on state of a mobile terminal on a network to a gateway;
receive reply information that is about the camp-on state of the mobile terminal and returned by the gateway, wherein the reply information comprises the camp-on state of the mobile terminal;
determine, according to the camp-on state of the mobile terminal, a data volume of cached content to be pushed; and
send a pushing instruction to a main cache, wherein the pushing instruction is a first pushing instruction or a second pushing instruction; the first pushing instruction is sent to the main cache if the mobile terminal is in a first camp-on state, so as to control the main cache to push a first data volume of data of the cached content to the mobile terminal; and the second pushing instruction is sent to the main cache if the mobile terminal is in a second camp-on state, so as to control the main cache to push a second data volume of data of the cached content to the mobile terminal.

11. The apparatus according to claim 10, wherein that the first pushing instruction is sent to the main cache if the mobile terminal is in a first camp-on state, so as to control the main cache to push a first data volume of data of the cached content to the mobile terminal is specifically that:

if the mobile terminal camps on a non-3rd Generation Partnership Project (3GPP) network, the first pushing instruction is sent to the main cache, so as to control the main cache to push low-compression, high-resolution, and large-volume data of the cached content to the mobile terminal.

12. The apparatus according to claim 10, wherein that the second pushing instruction is sent to the main cache if the mobile terminal is in a second camp-on state, so as to control the main cache to push a second data volume of data of the cached content to the mobile terminal is specifically that:

if the mobile terminal camps on a 3rd Generation Partnership Project (3GPP) network, the second pushing instruction is sent to the main cache, so as to control the main cache to push low-resolution and small-volume data of the cached content to the mobile terminal.

13. The apparatus according to claim 10, wherein the processor is further configured to:

send a query request for a packet switching state of the mobile terminal to the gateway;

receive reply information that is about the packet switching state and returned by the gateway; and if the packet switching state of the mobile terminal is not activated, send a command for activating the packet switching state to a short message service center, so that the short message service center sends an SMS message to the mobile terminal according to the command for activating the packet switching state, so as to activate the packet switching state of the mobile terminal.

14. The apparatus according to claim 10, wherein the processor is further configured to:

send a uniform resource locator URL of the cached content to the mobile terminal, so that the mobile terminal acquires a description file of the cached content according to the uniform resource locator URL, determines, according to the description file, whether to agree to receive the cached content, and if agreed to receive, the mobile terminal assigns storage space to data of the cached content; and receive a message that is sent by the mobile terminal and indicates that storage space has been assigned.

15. The apparatus according to claim 14, wherein the pushing instruction comprises the uniform resource locator URL of the cached content, so that the main cache searches for corresponding cached content according to the uniform resource locator URL of the cached content.

16. The apparatus according to claim 10, wherein the processor is further configured to:

obtain, by means of screening, cached content that is in the main cache and to be pushed to the mobile terminal.

17. The apparatus according to claim 16, wherein the processor is further configured to determine, according to a mobile terminal identifier in each piece of cached content, a mobile terminal to which each piece of cached content is to be pushed.

18. The apparatus according to claim 17, wherein the processor is further configured to:

send classification information of the mobile terminal to a content provider, so that the content provider marks the cached content according to the classification information, and sends cached content that is marked with a classification identifier of the mobile terminal to the main cache.

* * * * *